United States Patent
Krüger et al.

(10) Patent No.: US 12,151,598 B2
(45) Date of Patent: Nov. 26, 2024

(54) LOCK UNIT WITH A COUPLING MECHANISM FOR INTEGRATED IDLE DISPLACEMENT

(71) Applicant: Brose Fahrzeugteile SE & Co. Kommanditgesellschaft, Coburg, Coburg (DE)

(72) Inventors: Frieder Krüger, Coburg (DE); Sebastian Tietz, Schleusingen (DE); Markus Welsch, Lichtenfels (DE); Michael Knab, Schwürbitz (DE); Armin Schafhauser, Bad Rodach (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 275 days.

(21) Appl. No.: 17/778,997

(22) PCT Filed: Nov. 19, 2020

(86) PCT No.: PCT/EP2020/082685
§ 371 (c)(1),
(2) Date: May 23, 2022

(87) PCT Pub. No.: WO2021/099464
PCT Pub. Date: May 27, 2021

(65) Prior Publication Data
US 2022/0410771 A1    Dec. 29, 2022

(30) Foreign Application Priority Data

Nov. 22, 2019 (DE) .................... 10 2019 218 103.1

(51) Int. Cl.
*B60N 2/36* (2006.01)
(52) U.S. Cl.
CPC ................. *B60N 2/366* (2013.01)

(58) Field of Classification Search
CPC ... B60N 2/00; B60N 2/32; B60N 2/36; B60N 2/366; B60N 2/04
(Continued)

(56) References Cited

U.S. PATENT DOCUMENTS

| 2008/0007104 A1* | 1/2008 | Yokota | B60N 2/1615 297/344.15 |
| 2010/0270455 A1* | 10/2010 | Obrecht | B60N 2/01583 248/503.1 |

(Continued)

FOREIGN PATENT DOCUMENTS

| CN | 104470753 A | 3/2015 |
| CN | 104507748 A | 4/2015 |

(Continued)

OTHER PUBLICATIONS

Chinese Office Action for Application No. CN 202080080514.6, Dated Apr. 20, 2023, English Translation attached to original, All together 20 Pages.

*Primary Examiner* — Nathan Cumar
(74) *Attorney, Agent, or Firm* — Dickinson Wright PLLC

(57) ABSTRACT

A lock unit for a vehicle, having a carrier, a locking element, an arresting element, pivotable on the carrier between an arresting position and an unlocking position and, in its arresting position, arrests the locking element, in the locking position, not adjustable to the release position and, in its unlocking position, allows adjustment of the locking element from the locking position to the release position, and an actuating element, adjustable on the carrier within an adjustment region and configured to pivot the arresting element from the arresting position towards unlocking position. The actuating element is coupled to the arresting element via a coupling mechanism, so that an adjustment movement of the actuating element is converted into a pivoting movement of the arresting element towards the (Continued)

locking position of the latter, only in part of the adjustment region of the actuating element.

21 Claims, 6 Drawing Sheets

(58) Field of Classification Search
USPC .......................................................... 70/261
See application file for complete search history.

(56) References Cited

U.S. PATENT DOCUMENTS

| | | | |
|---|---|---|---|
| 2015/0175041 A1* | 6/2015 | Kuzma | B60N 2/919 |
| | | | 297/463.1 |
| 2015/0298586 A1* | 10/2015 | Rothstein | B60N 2/305 |
| | | | 297/378.12 |
| 2017/0274799 A1* | 9/2017 | Pauls | B60N 2/2356 |
| 2018/0194251 A1* | 7/2018 | Kreuels | B60N 2/36 |
| 2019/0232821 A1* | 8/2019 | Ellison | B60N 2/2251 |
| 2019/0366883 A1* | 12/2019 | Ultsch | B60N 2/686 |

FOREIGN PATENT DOCUMENTS

| | | | |
|---|---|---|---|
| CN | 103459736 B * | 9/2015 | ......... B60N 2/01516 |
| CN | 107148369 A | 9/2017 | |
| CN | 108349412 A | 7/2018 | |
| CN | 110267846 A | 9/2019 | |
| DE | 69402023 T2 | 6/1997 | |
| DE | 19650136 A1 | 6/1998 | |
| DE | 19952634 C1 | 8/2001 | |
| DE | 102014209543 A1 | 11/2014 | |
| DE | 102013216721 A1 | 2/2015 | |
| DE | 102014007970 A1 | 12/2015 | |
| EP | 1375242 A2 | 1/2004 | |
| JP | 2008013112 A | 1/2008 | |

* cited by examiner

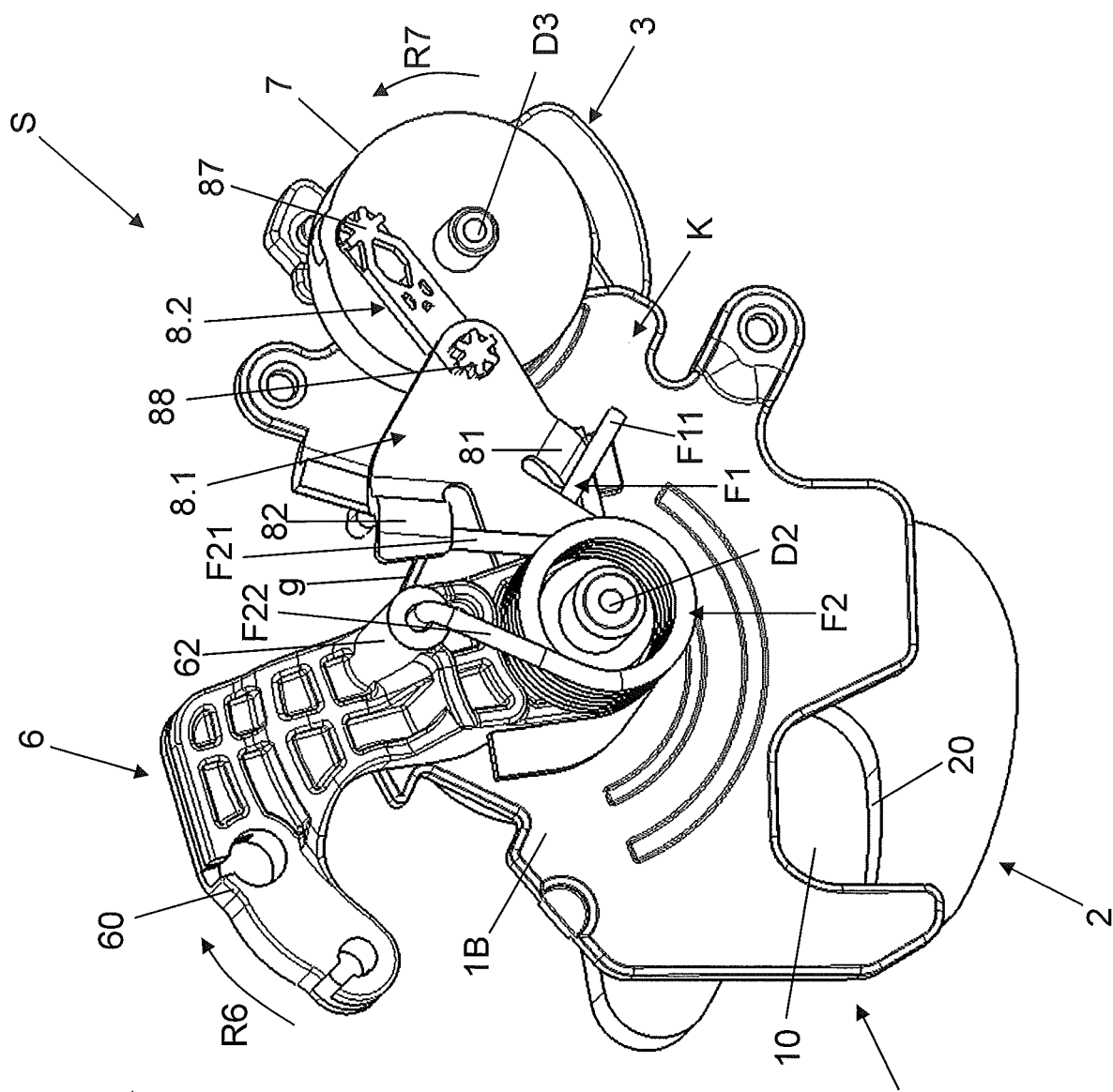

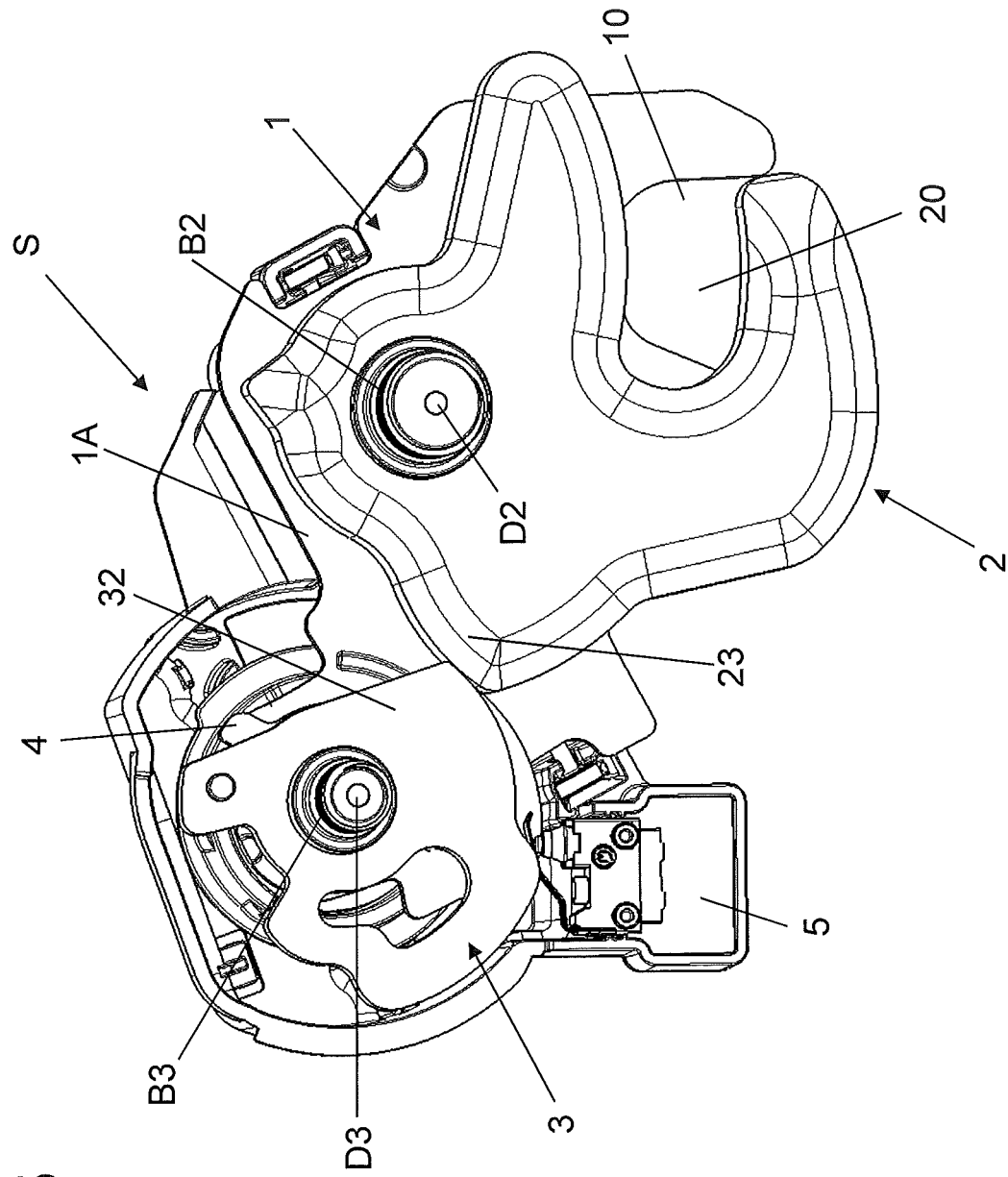

LOCK UNIT WITH A COUPLING MECHANISM FOR INTEGRATED IDLE DISPLACEMENT

CROSS-REFERENCE TO RELATED APPLICATIONS

This application is the U.S. National Phase of PCT Application No. PCT/EP2020/082685 filed on Nov. 19, 2020, which claims priority to German Patent Application No. DE 10 2019 218 103.1, filed on Nov. 22, 2019, the disclosures of which are hereby incorporated in their entirety by reference herein.

TECHNICAL FIELD

The present disclosure relates to a lock unit for a vehicle.

BACKGROUND

Lock units for the automotive sector are known in different configurations. For example, lock units are used for locking vehicle seat components, for instance to releasably lock a seat base to a floor assembly or to releasably lock a backrest of a vehicle seat to a seat base. A lock unit in principle comprises a one- or multi-part carrier, a locking element pivotally mounted on the carrier between a locking position and a release position, and an arresting element for securing the locking element in its locking position. The arresting element is pivotally held on the carrier between an arresting position and an unlocking position so that in its arresting position the arresting element arrests the locking element present in its locking position against an adjustment into the release position, and in its unlocking position permits an adjustment of the locking element from the locking position into its release position. To pivot the arresting element from the arresting position in the direction of the unlocking position and hence unlock the lock unit, an actuating element is provided on the carrier of the lock unit, which is adjustable within a specified adjustment range. For example, the actuating element is an unlocking lever accessible from outside a housing of the lock unit for a manual or motorized actuation of the lock unit. In the last-mentioned case, the unlocking lever thus can be adjustable for example via a drive motor in order to be able to unlock the lock unit in a power-operated way.

In lock units known so far, an actuating element typically acts directly on the arresting element so that an adjusting movement of the actuating element directly results in a pivotal movement of the arresting element. As a result, a particular type of lock unit regularly is not usable either for other purposes or other installation space scenarios without a comparatively complex constructional adaptation, as for example an actuating path and an actuating direction of the actuating element are directly coupled to the pivotal movement of the arresting element, and correspondingly a change desired in this respect directly leads to a comparatively complex adaptation of the arresting element.

SUMMARY

One or more objects underlying the present disclosure to provide an improved lock unit.

In one or more embodiments, a lock unit including an actuating element coupled to an arresting element via a coupling mechanism, via which an adjusting movement of an actuating element can be converted into a pivotal movement of the arresting element in the direction of its unlocking position merely in a sub-section of the adjustment range of the actuating element, is provided.

Hence, in one sub-section an adjusting movement of the actuating element is converted into a pivotal movement of the arresting element via the coupling mechanism, while in at least one other sub-section of the adjustment range on the side of the actuating element an adjusting movement of the actuating element remains without a pivotal movement of the arresting element, and the actuating element consequently can perform an adjusting movement independent of a pivotal movement of the arresting element (i.e. an adjusting movement that does not result in a pivotal movement of the arresting element). In this way, an idle stroke function (also referred to as overstroke function) consequently is integrated into the lock unit via the coupling mechanism. Thus, an idle stroke or overstroke movement of the actuating element becomes possible, which does not lead to a pivotal movement of the arresting element. In turn, the flexibility of such a lock unit for different installation space situations and utilization scenarios thereby is increased considerably.

For example, a mechanical coupling to a further lock unit is possible, in which both lock units are to be operated and, for example, to be unlocked by actuating an individual actuating element. Due to the idle stroke function integrated into at least one lock unit corresponding to the proposed solutions, an adjusting movement of the actuating element can lead to a pivotal movement of an arresting element in one lock unit, while in the other lock unit merely an idle path is bridged without pivoting the associated arresting element. Thus, different types of actuation and/or different actuating force and hence adjusting force profiles can be realized comparatively easily for the actuation of one or more lock units. As an example, an idle stroke function integrated into a lock unit provides for an easier tolerance compensation, for example with several (at least two) lock units mechanically coupled to each other.

In one or more embodiments, an idle stroke function is integrated into the lock unit via the coupling mechanism, in which the actuating element can be adjusted along at least one idle path of its adjustment range for releasing a locking provided via the lock unit, without causing a pivotal movement of the arresting element. Based on a starting position of the actuating element, from which the actuating element can be adjusted into an end position within the adjustment range in order to adjust the arresting element from its arresting position in the direction of its unlocking position, the idle path here can be provided at the beginning of the adjustment range,
in the middle of the adjustment range,
at the end of the adjustment range, or
at the beginning and at the end of the adjustment range.

Via the integrated idle stroke function, the actuating element thus, for example, may initially bridge an idle path already at the beginning of an adjustment from the starting position, before the further adjusting movement of the actuating element leads to a pivotal movement of the arresting element. Alternatively, an idle path can be provided at the end of the adjusting movement of the actuating element so that from an adjustment position of the actuating element until reaching the end position no pivotal movement of the arresting element is caused any longer by the actuating element. Alternatively, an idle path can be provided between two sub-sections of the adjustment range specified for the actuating element, in which an adjusting movement of the actuating element each leads to a pivotal movement of the arresting element. For example, during an initial adjusting movement of the actuating element, the arresting element initially can be pivoted in a controlled way before an idle path is bridged by the actuating element, in which idle path no pivotal movement of the arresting element takes place, so that subsequently a pivotal movement of the arresting element is caused again during the further adjustment of the actuating element. Alternatively, an idle path can be provided both at the beginning and at the end of the adjustment range specified for the actuating element.

In principle, the actuating element itself can be pivotally mounted, such as about the axis of rotation of the locking element. A pivotal movement of the actuating element thus results in a pivotal movement of the arresting element at least over a sub-section of the adjustment range. Alternatively or additionally, the actuating element can also be pivotally mounted on the one-part or multi-part carrier of the lock unit.

For a compact configuration of the lock unit, the coupling mechanism in one design variant comprises a driver element rotatably mounted coaxially to an axis of rotation of the arresting element, which is positively engaged with the arresting element. Consequently, in such a design variant an adjusting force introduced into the coupling mechanism by the actuating element is transmitted via a rotatably mounted driver element, which can transmit this adjusting force to the arresting element via at least one form fit. For the positive engagement with the arresting element, at least one driver portion can be provided for example on the driver element, which is formed to be axially protruding with respect to the axis of rotation of the arresting element.

For the transmission of an adjusting force to the driver element positively engaged with the arresting element, the coupling mechanism can comprise at least one driver coupling member which, with respect to the axis of rotation of the arresting element (and hence of the driver element), is eccentrically articulated to the driver element. Due to the eccentric articulation to the driver element, an adjusting force can be introduced via the driver coupling member on a virtual lever arm, which applies a torque on the driver element about the axis of rotation coinciding with the axis of rotation of the arresting element.

In one design variant, the coupling mechanism can comprise at least one slotted link guide for the conversion of an adjusting movement of the actuating element into a pivotal movement of the arresting element. Consequently, the coupling mechanism comprises at least one slotted link guide for the transmission of an adjusting force adjusting the arresting element in the direction of the unlocking position from the actuating element to the arresting element.

The at least one slotted link guide can comprise a guide link adjustable by means of the actuating element and/or at least one guide link immovable with respect to the carrier, i.e. firmly mounted on the carrier. The one adjustable guide link consequently is adjustable by means of the actuating element, while the actuating element is adjustable relative to the other immovable guide link. Depending on whether the guide link of the slotted link guide is present individually or in combination, different adjusting movements can be converted via the coupling mechanism, in order to transmit an adjusting force—with idle stroke function—to the arresting element during an adjusting movement of the actuating element.

For example, one design variant provides that the guide link immovable with respect to the carrier includes two slotted link portions that differ from each other with regard to a gear ratio realized thereby between an adjusting movement of the actuating element and a resulting pivotal movement of the arresting element. For example, one of the two different slotted link portions can be adapted and provided for a continuous gear ratio. Such a continuous gear ratio then for example is provided for an adjusting movement of the actuating element, which is converted into a corresponding pivotal movement of the arresting element. Furthermore another, second slotted link portion can be adapted and provided for a discontinuous gear ratio. Then, for example an overstroke of the actuating element is realized with such a slotted link portion so that a (further) adjusting movement of the actuating element in the direction of its end position leads to no or at best a minor pivotal movement of the arresting element—in relation to an adjustment path of the actuating element.

In one exemplary embodiment, the two slotted link portions define two portions of a guideway for a guide element of the at least one slotted link guide to be guided along the guide link, wherein these two portions of the guideway are oriented at an angle, e.g. at an angle in the range of 70° to 160°, to each other. Thus, the guide element is redirected in its course along the guideway in a transition from one slotted link portion into the other slotted link portion so that a gear ratio variable along the guideway, i.e. a changing gear ratio, can be realized thereby. In one or more embodiments, the guideway can have a curved course in at least one portion, which is specified by the geometry of the respective slotted link portion.

In a combination of the at least one slotted link guide with a driver coupling member of the coupling mechanism, which is eccentrically articulated to the driver element, it can be provided for example that on the driver coupling member a guide element of the at least one slotted link guide is provided, which is shiftably held on a guide link of the at least one slotted link guide. By shifting the guide element on the side of the coupling member along the guide link, the driver coupling member consequently can be adjusted so that via an articulation to the driver element, the same transmits an adjusting force to the driver element for adjusting the arresting element.

As an example, it can be provided in this connection that the guide element of the driver coupling member is shiftably held both on the adjustable guide link and on the guide link immovable with respect to the carrier, and the guide links overlap at least in part. Thus, the guide element of the driver coupling member is link-guided twice within the coupling mechanism. In this way, a comparatively complex adjustment path can be forced upon the guide element as a result of an adjusting movement of the actuating element, although the mechanism provided therefor is to be realized in a comparatively simple and fail-safe way.

In an alternative design variant, the coupling mechanism of the lock unit comprises at least one spring element applying a pretensioning force, against whose pretensioning force the actuating element can be adjusted once within its adjustment range for bridging an idle path. Thus, the coupling mechanism provides a spring-element-supported force coupling in order to integrate an idle path into the lock unit. Consequently, the actuating element can be adjusted at least once within its adjustment range against the pretensioning force of the at least one spring element, without this involving a pivotal movement of the arresting element.

For example, it is provided that by the at least one spring element the actuating element is pretensioned with respect to an adjustable actuator coupling member of the coupling mechanism. This actuator coupling member can be adjustable together with the actuating element during an adjustment of the actuating element in the one sub-section of the adjustment range, in which a pivotal movement of the arresting element results from the adjustment of the actuating element, in that an adjusting force applied on the actuating element can be transmitted to the actuator coupling member via the at least one spring element. On the other hand, in the other sub-section in which the idle path is to be bridged, the actuating element can be adjusted relative to the actuator coupling member against the pretensioning force applied by the at least one spring element.

The beginning of the idle path, based on an adjusting movement of the actuating element for pivoting the arresting element into its unlocking position (and hence for unlocking the lock unit, can be defined by a mechanical stop against which the actuator coupling member abuts at the end of the one sub-section. The mechanical stop can be provided between cooperating coupling members of the coupling mechanism or within a locking mechanism of the lock unit comprising the locking element and the arresting element. In this connection it merely is relevant that the actuating element pretensioned against the actuator coupling member via the at least one spring element initially can be adjusted together with the actuator coupling member until reaching the stop, and an increased adjusting force must be applied on the actuating element as a result of reaching the stop in order to overcome the pretensioning force of the at least one spring element and adjust the actuating element relative to the actuator coupling member. The actuating element can be adjusted again only subsequently by means of the tensioned spring element and the actuator coupling member, which leads to a pivotal movement of the arresting element.

In one design variant, the at least one spring element of the coupling mechanism is provided in addition to at least one return spring that pretensions the actuating element in the direction of a starting position from which the actuating element is to be adjusted in the direction of an end position for pivoting the arresting element into its unlocking position (and hence for unlocking the lock unit). Thus, in this design variant the lock unit includes at least two different spring elements to which different functions are assigned within the lock unit. While the return spring is adapted and provided for an automatic reset of the actuating element, when no more adjusting force, applied for example manually or in a power-operated way, acts on the actuating element for unlocking the lock unit, the at least one spring element of the coupling mechanism serves to provide a force coupling and thereby the integration of an idle stroke or overstroke function into the lock unit.

In principle, the proposed lock unit can be provided for a vehicle seat, for example in order to releasably lock a backrest part, such as a backrest or a through-loading unit, to a seat base or a body-mounted interior component or to releasably lock a seat base to a floor assembly fixed to a vehicle floor. Thus, the proposed solution may be used as a lock unit for a seat adjustment system.

Correspondingly, the proposed solution also relates to a vehicle seat comprising a design variant of a proposed lock unit.

The proposed solution, however, can also be employed for other applications and systems, such as e.g. for locking vehicle doors or flaps.

BRIEF DESCRIPTION OF THE DRAWINGS

The attached Figures by way of example illustrate possible design variants of the proposed solution.

In the drawings:

FIG. 3A shows a side view of another design variant of a proposed lock unit comprising a coupling mechanism which integrates an idle stroke function into the lock unit via a force coupling;

FIG. 5 shows a side view of a locking mechanism for a lock unit of FIGS. 1 to 3B.

DETAILED DESCRIPTION

Figure 1:
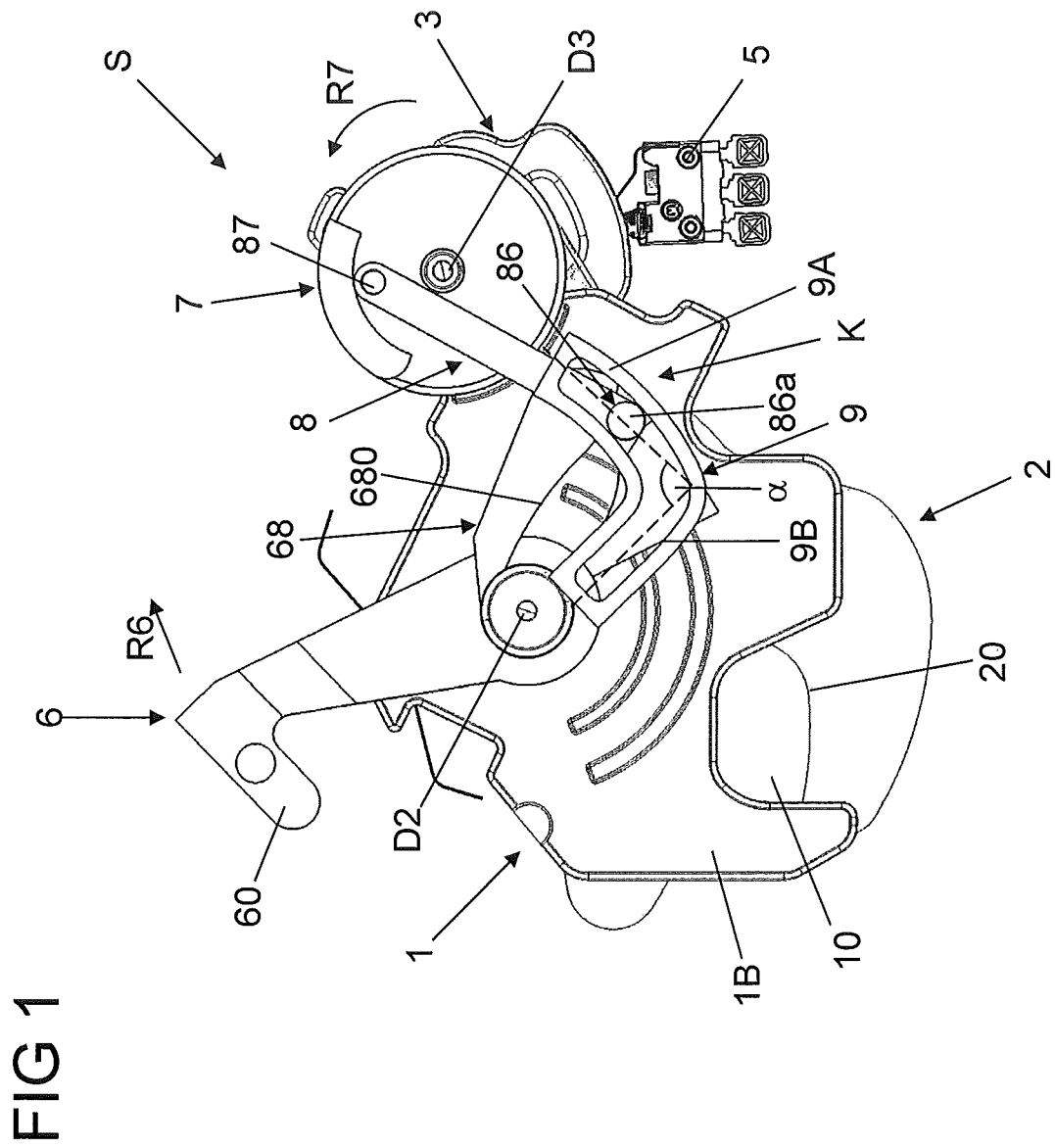
FIG. 1 shows a side view of a design variant of a proposed lock unit, which integrates an idle stroke function by means of a coupling mechanism including a slotted link guide.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 5 shows a side view of a lock unit S comprising a locking mechanism in which a locking element in the form of a rotary latch 2 pivotable about an axis of rotation D2 is mounted on a carrier in the form of a base plate 1. The rotary latch 2 is pivotable about the pivot axis D2 between a locking position shown in FIG. 5 and a release position. In the locking position, the rotary latch 2 is provided to positively receive a counter-element, for example a locking bolt or striker, which engages into a locking receptacle 10 of the base plate 1, in a rotary latch mouth 20 of the rotary latch 2 and thereby lock the same for example to the base plate 1 in a crash-proof way. The illustrated lock unit S can be used for example for locking on a vehicle seat.

To secure the rotary latch 2 in the locking position taken against an adjustment into the release position, an arresting element in the form of an arresting pawl 3 is provided in a manner known per se. This arresting pawl 3 likewise is pivotally mounted on the base plate 1. An axis of rotation D3 for pivotally mounting the arresting pawl 3 here extends parallel to the axis of rotation D2 of the rotary latch 2. The arresting pawl 3 is pivotable about this (second) axis of rotation D3 between an arresting position corresponding to FIG. 5 and an unlocking position. In the locking position, the arresting pawl 3 rests against a contact portion 23 of the rotary latch 2 via an arresting portion 32, in order to secure the rotary latch 2 against an adjustment from the locking position taken. When the arresting pawl 3 is pivoted into its unlocking position, it releases the rotary latch 2 so that the rotary latch 2 can pivot about its axis of rotation D2 into its release position, whereby the rotary latch 2 can be brought out of engagement with the counter-element, which in the locking position is received in the rotary latch mouth 20.

To eliminate any clearance in the locking position of the rotary latch 2 and/or to additionally secure the locking position of the rotary latch 2, for example in the case of extraordinarily high loads (e.g. due to a crash) acting on the lock unit 1, an additional arresting element 4 is pivotally mounted about the axis of rotation D3 of the arresting pawl 2. During a pivotal movement of the arresting pawl 3, this additional arresting element 4 is entrained in the direction of the unlocking position of said arresting pawl and along with the arresting pawl 3 can be adjusted back into a pivot position eliminating any clearance in the locking position of the rotary latch 2 and/or additionally securing the locking position.

In addition, the lock unit 1 integrates an electronic detection device comprising a microswitch 5. The microswitch 5 is operatively connected to the arresting pawl 3 in order electronically detect when the arresting pawl 3 takes its locking position and hence the lock unit S is in a locking state.

The rotary latch 2 and the arresting pawl 3 as well as the additional arresting element 5 are provided on an inside 1A of the base plate 1. Fastening elements in the form of threaded bolts B2, B3 each protrude from this inside 1A of the base plate 1 along the axes of rotation D2 and D3, via which the lock unit 1 is to be properly fixed to an assembly to be locked, for example to a backrest part of a vehicle seat.

FIGS. 1, 2 and 3A-3B show design variants of the lock unit 1 of FIG. 5 with a view to an outside 1B of the base plate 1 facing away from the inside 1A, on which a coupling mechanism K is provided. Via this coupling mechanism K an actuating or adjusting force applied on an actuating element, here in the form of an unlocking lever 6, can be transmitted to the arresting pawl 3 in order to specifically pivot the arresting pawl 3 into its unlocking position and hence permit pivoting of the rotary latch 2 into its release position and consequently unlocking of the lock unit S. In the present case, the unlocking lever 6 for example is provided for a manual or power-operated actuation. For this purpose, the unlocking lever 6 likewise is pivotally mounted on the axis of rotation D2 of the rotary latch 2 (independently of the rotary latch 2) and has an actuating area 60 radially protruding beyond an edge of the base plate 1 with respect to the axis of rotation D2. In this way, the actuating area 60 for example is also accessible from outside a housing of the lock unit S (not shown) and can be actuated manually or be coupled to a transmission member for a manual or power-operated, i.e. motorized, actuation of the unlocking lever 6 in a simple way.

In the design variants of FIGS. 1, 2 and 3A-3B the unlocking lever 6 each can be pivoted about the axis of rotation D2 of the rotary latch 2 from a starting position each shown in the Figures along an actuating direction R6 in the direction of a permitted end position in order to properly cause unlocking of the lock unit 1. The unlocking lever 6 is mechanically coupled to the arresting pawl 3 via the respective coupling mechanism so that the pivotal movement of the unlocking lever 6 along the actuating direction R6 leads to a pivotal movement of the arresting pawl 3 along a direction of rotation R7 about the axis of rotation D3 in the direction of the unlocking position of the arresting pawl 3. In all design variants of FIGS. 1, 2 and 3A-3B, the coupling mechanism K each is designed in such a way that an adjusting movement of the unlocking lever 6 within the specified adjustment range (proceeding from the starting position into an end position) leads to a pivotal movement of the arresting pawl 3 in the direction of its unlocking position merely in a subsection of this adjustment range. The respective lock units S of FIGS. 1, 2 and 3A-3B each integrate an idle stroke function, in which the unlocking lever 6 can be adjusted along at least one idle path to release a locking provided via the lock unit S, without causing a pivotal movement of the arresting pawl 3.

Figure 2:
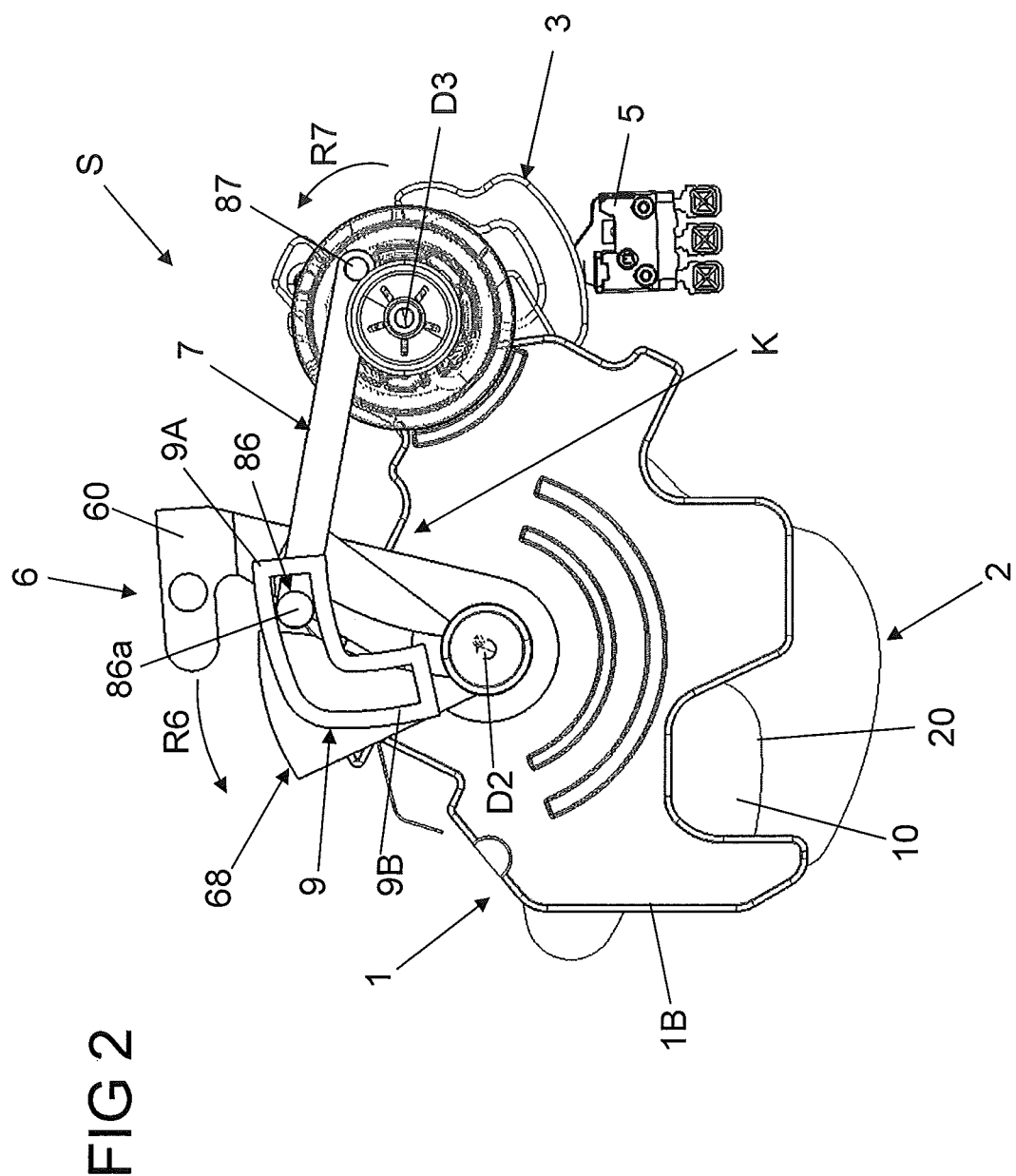
FIG. 2 shows a modification of the lock unit on the basis of the construction of the lock unit of FIG. 1, in which for unlocking the lock unit, the actuating element can be adjusted in an opposite actuating direction as compared to the variant of FIG. 1.
Figure 3B:
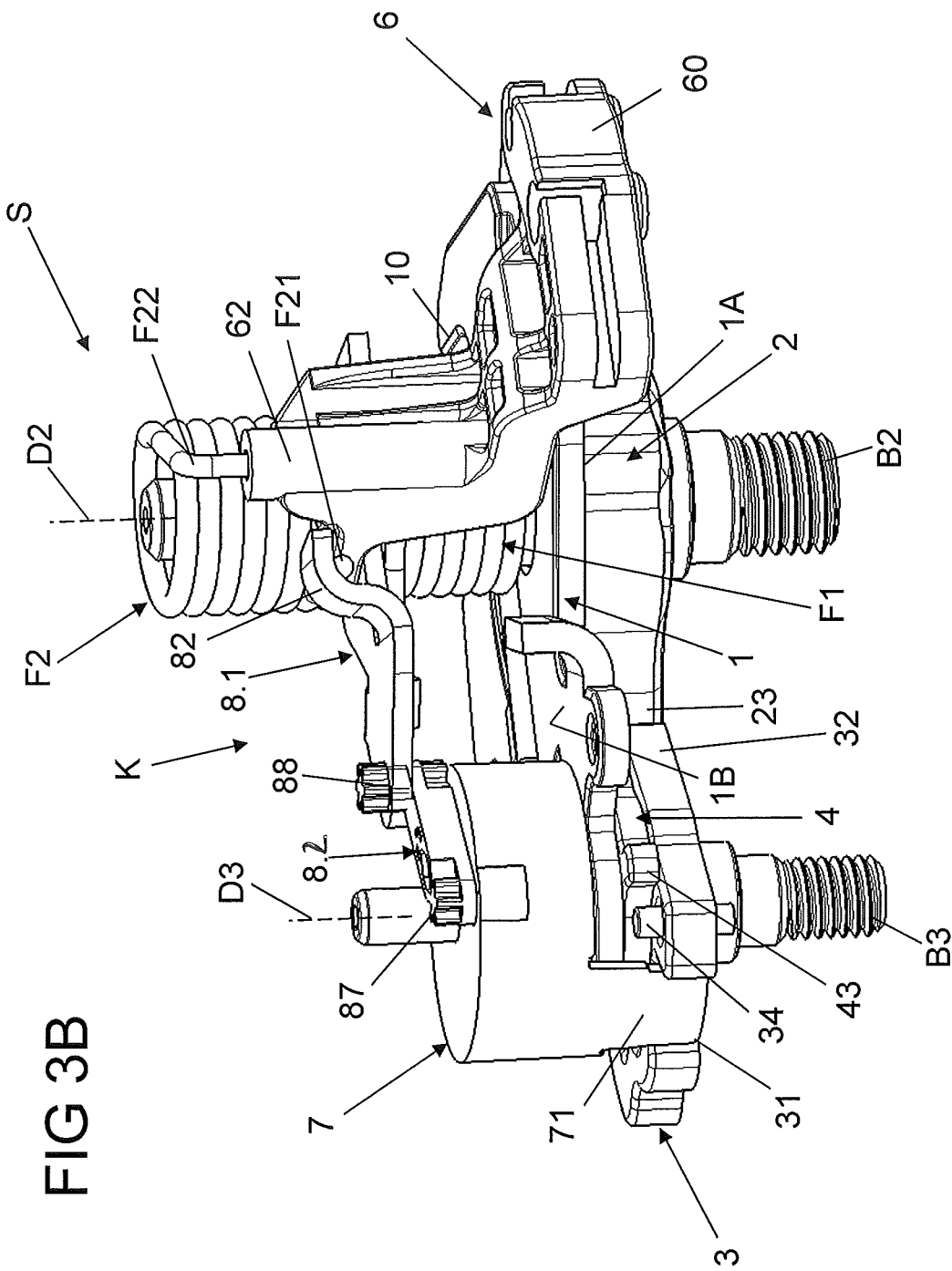
FIG. 3B shows the lock unit of FIG. 3A in a perspective representation.

For integrating the idle stroke function, the design variants of FIGS. 1 and 2 each include a slotted link guide, while the design variant of FIGS. 3A and 3B therefor provides a force coupling by means of a coupling spring configured as a leg spring.

In the design variant of the lock unit S of FIG. 1, the coupling mechanism K includes two guide links 680 and 9 in order to transmit an adjusting movement of the unlocking lever 6 along the actuating direction R6 to the arresting pawl 3 with a variable gear ratio. A guide link 680 is formed in a slotted link portion 68 non-rotatably connected to the unlocking lever 6. The other guide link 9 on the other hand is immovable with respect to the base plate 1 and hence firmly mounted on the carrier. The immovable guide link 9 can be provided for example on a housing part of the lock unit S opposite the outside 1B of the base plate 1.

A guide element in the form of a guide pin 86a engages into both guide links 680 and 9, which guide pin is provided at a rod end 86 of a driver coupling member in the form of a coupling rod 8. At its other rod end 87, the coupling rod 8 is articulated to a driver 7 eccentrically to the axis of rotation D3, which driver is rotatably mounted on the base plate 1 about the axis of rotation D3 of the arresting pawl 3. With a driver web 71 axially protruding with respect to the axis of rotation D3 (see FIG. 3B), the driver 7 positively engages into an interface of the arresting pawl 3 formed by a cutout 31 on the opposite inside 1A of the base plate 1. Since the driver 7 rotatably mounted on the outside 1B of the base plate 1 is positively engaged with the arresting pawl 3 pivotally mounted on the inside 1A of the base plate 1, the driver 7 entrains the arresting pawl 3 during a rotation about the axis of rotation D3. Via the coupling mechanism K, a pivotal movement of the unlocking lever 6 along the actuating direction R6 (in FIG. 1 in clockwise direction) hence can be converted into a rotary movement of the driver 7 in an opposite direction of rotation R7 (in anti-clockwise direction), which in turn pivots the arresting pawl 3 from its arresting position into the unlocking position.

Via the guide pin 86a link-guided twice, via which a pivotal movement of the unlocking lever 6 can be converted into a rotary movement of the driver 7, and via the arrangement and design of the guide links 680 and 9 it is achieved that the pivotal movement of the unlocking lever 6 from its starting position shown in FIG. 1 along the actuating direction R6 does not lead to a pivotal movement of the arresting pawl 3 at least in a sub-section. In at least one sub-section, a pivotal movement of the unlocking lever 6 consequently does not result in a pivotal movement of the arresting pawl 3 or a bridged pivot angle of the arresting pawl 3 is smaller than an actuating angle of the unlocking lever 6 at least by a multiple. Via the slotted link guide of the coupling mechanism K, an idle stroke function thus is integrated into the lock unit S.

In the present case, the guide pin 86a on the side of the coupling rod is shiftably received in the guide link 680 pivotable by means of the unlocking lever 6, which extends in the slotted link portion 68, for example, radially with respect to the axis of rotation D2 of the unlocking lever 6. The geometry of the movable guide link 680 here is chosen such that in a sub-section of the adjustment range permitted for the unlocking lever 6 close to the end position, the guide pin 86*a* is disposed on a slotted link portion of the movable guide link 680 expanding in the direction of the axis of rotation D2. In this expanding slotted link portion of the movable guide link 680, the guide pin 86*a* no longer is entrained by the guide link 680 during pivoting of the unlocking lever 6 in such a way that the coupling rod 8 undergoes a displacement about the axis of rotation D3 of the driver 7 when the unlocking lever 6 has been adjusted from its starting position to a specified extent. Rather, the coupling rod 8 then will follow the adjusting movement of the guide link 680 solely by pivoting about the rod end 87 articulated to the driver 7. In the corresponding sub-section of the permitted adjustment range for the unlocking lever 6, a (further) pivotal movement of the unlocking lever 6 thus does not involve any rotary movement towards the driver 7.

Via the additional immovable guide link 9, the gear ratio between an actuating angle bridged by the unlocking lever 6 and a rotary angle of the driver 7 is specified and varied over the adjustment range of the unlocking lever 6. The immovable guide link 9 includes two slotted link portions 9A and 9B, which in the present case define an L-shaped guideway for the guide pin 86*a* in the guide link 9. The two slotted link portions 9A and 9B accordingly define two portions of a continuous guideway for the guide pin 86*a*, which are oriented at an angle α, in the present case with α in the range between 80° and 110°, to each other. Proceeding from the one slotted link portion 9A, in which the guide pin 86*a* is present in the starting position of the unlocking lever 6, a course of the guideway thus changes in the second slotted link portion 9B, in which the guide pin 86*a* is present in the direction of an end position of the unlocking lever 6. In the present case, the second slotted link portion 9B extends at least with one directional component towards the axis of rotation D2 of the unlocking lever 6, while the first slotted link portion 9A extends at least approximately along a portion of a circular path around the first axis of rotation D2. Hence, in the first slotted link portion 9A a continuous gear ratio is provided between the pivotal movement of the unlocking lever 6 and a pivotal movement of the driver 7 and hence of the arresting pawl 3, while the gear ratio is discontinuous over the second slotted link portion 9B up to an infinitely small gear ratio. More exactly, the second slotted link portion 9B in the present case extends at least approximately along a portion of a circular path around the axis of rotation of the rod end 87 on the driver 7, when an end of an adjusting movement of the arresting pawl 3 is reached. In this way, gearing down into the infinitely small can be achieved.

In the variant of a lock unit S of FIG. 2 based on the exemplary embodiment of FIG. 1, the coupling mechanism K is designed identical in construction with a link guide. In contrast to the design variant of FIG. 1, however, for example, the starting position of the unlocking lever 6 is chosen differently so that the unlocking lever 6 must be pivoted in an opposite actuating direction R6 (in anti-clockwise direction) into an end position in order to trigger a pivotal movement of the arresting pawl 3 in the direction of rotation R7 and hence in the direction of its unlocking position. For this purpose, merely the slotted link portion 68 to be non-rotatably arrested with the unlocking lever 6 is rotated about the axis of rotation D2 with the movable guide link 680 as compared to the exemplary embodiment of FIG. 1, and the immovable, carrier-mounted guide link 9 is provided in mirrored form.

With the link-based coupling mechanism K, the lock unit S consequently can be variably adapted without any constructional changes of the components of the locking mechanism of the lock unit S with regard to the actuating direction of the unlocking lever 6 to be realized for unlocking the lock unit S, the actuating path to be realized and the actuating force to be applied and a sequence of movements to be realized via the coupling mechanism K. In the present case, for example, merely the coupling mechanism K must be provided with the unlocking lever 6 to be provided in another starting position and with components arranged in different positions relative to each other and must be connected to the arresting pawl 3 via the driver 7 in order to provide different types of lock units S.

In the design variant of FIGS. 3A and 3B, the coupling mechanism K is configured without slotted link guide. Here, force coupling is provided for the integration of an idle stroke into the lock unit S. For this force coupling, the coupling mechanism K for example, includes a coupling spring F2 which here is configured as a leg spring.

With a first spring leg F21, the coupling spring F2 is supported on a tab-shaped support portion 83 of an actuating coupling member of the coupling mechanism K configured as a first coupling lever 8.1 and on the other hand via another spring leg F22 on the unlocking lever 6. For supporting on the unlocking lever 6, the one spring leg F22 is inserted into a spring connecting portion in the form of a plug-in sleeve 62 of the unlocking lever 6. Via the coupling spring F2, the unlocking lever 6 and the first coupling lever 8.1 consequently are pretensioned against each other. In the starting position of the unlocking lever 6, the unlocking lever 6 and the first coupling lever 8.1 are spaced apart from each other by an idle path g or gap so that for pivoting the unlocking lever 6 about the axis of rotation D2 an adjusting force applied onto the unlocking lever 6 initially can be transmitted to the first coupling lever 8.1 via the coupling spring F2.

The first coupling lever 8.1 furthermore is hingedly connected to a driver coupling member in the form of a second coupling lever 8.2 of the coupling mechanism K. The first and the second coupling lever 8.1, 8.2 here are connected via a connecting joint 88. Furthermore, the second coupling lever 8.2 is eccentrically articulated to the driver 7 at a rod end 87 analogously to the coupling rod 8 of the design variant of FIGS. 1 and 2.

In addition to the coupling spring F2, the lock unit S includes a return spring F1. This return spring F1 likewise is configured as a leg spring. The return spring likewise is supported on the first coupling lever 8.1 with a spring leg F11, here on a further tab-like support portion 81, and on the other hand on a portion firmly mounted on the base plate, in order to pretension the first coupling lever 8.1 against the base plate 1 and hence pretension the unlocking lever 6 into its starting position. In this way, the unlocking lever 6 is automatically moved back into its starting position by means of the return spring F1, when no more adjusting force acts on the unlocking lever 6. Coils of the leg springs of the return spring F1 and the coupling spring F2 in the present case extend around a bearing pin which in the present case extends along the axis of rotation D2 of the rotary latch 2 and protrudes from the outside 1B of the base plate 1.

When the unlocking lever 6 is pivoted along the actuating direction R6 in order to unlock the lock unit S, an actuating force initially must be applied for the pivotal movement, which is counteracted by a restoring force of the return spring F1. Via the coupling levers 8.1 and 8.2 of the coupling mechanism K, the pivotal movement of the unlocking lever 6 and hence the adjusting force applied on the unlocking lever 6 is transmitted to the driver 7 and thereby to the arresting pawl 3 in order to adjust the arresting pawl 3 in the direction of its unlocking position. When the arresting pawl 3 abuts against a stop 43 of the additional arresting element 4 via a drive pin 34, the additional arresting element 4 also is entrained by the arresting pawl 3.

During this initial pivotal movement of the unlocking lever 6, the coupling spring F2 urges both coupling levers 8.1, 8.2 apart. Only when the first coupling lever 8.1 is adjusted against a stop within the lock unit S, the coupling spring F2 is tensioned. The actuating force to be applied on the part of the unlocking lever 6 can lead to an adjusting movement of the unlocking lever 6 relative to the first coupling lever 8.1, without this involving a pivotal movement of the arresting pawl 3. Bridging of a gap and hence of a corresponding idle path g at the end of the actuation between a portion of the unlocking lever 6 and a portion of the first coupling lever 8.1 and a related tensioning of the coupling spring F2 becomes possible when the first coupling lever 8.1 is urged against a stop within the coupling mechanism K.

Figure 4:
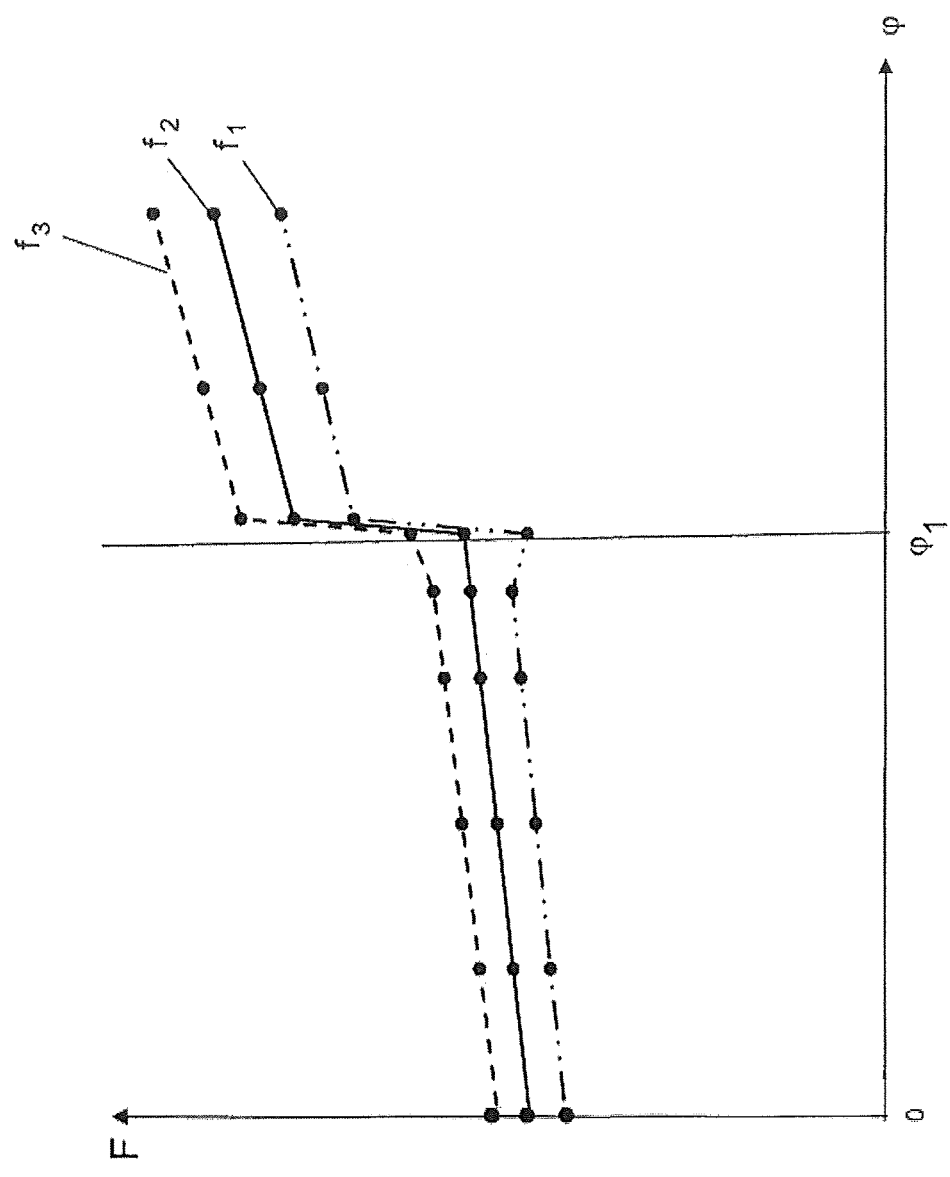
FIG. 4 shows a diagram of adjusting force vs. actuating angle, by representing various profiles for an adjusting force to be applied over an actuating angle of a pivotable unlocking lever of the lock unit for unlocking the lock unit of FIGS. 3A and 3B.

In this connection, the diagram of FIG. 4 illustrates the actuating force F to be applied at the unlocking lever 6 over an actuating angle φ of the unlocking lever 6, which the same covers around the axis of rotation D2 from its starting position. In FIG. 4, three different force lines $f_1$, $f_2$ and $f_3$ are plotted over the actuating angle φ. The force line $f_1$ illustrates the actuating force to be applied at least at the unlocking lever 6, while the force line $f_3$ illustrates the maximum possible actuating force. The force line $f_2$ correspondingly represents the actuating force to be nominally applied for unlocking the lock unit S over the actuating angle φ.

Regardless of the force lines $f_1$, $f_2$, $f_3$, the illustration of FIG. 4 reveals that the actuating force to be applied in a first angular range up to a switching angle $φ_1$ above all must overcome the force of the return spring F1. The actuating force to be applied is distinctly higher only from the switching angle $φ_1$ and must overcome the restoring force of the coupling spring F2. A specified minimum spring force of the coupling spring F2 always is above the maximum possible spring force of a closing spring of the locking mechanism, in order to initially produce a movement of the arresting elements 3, 4. Via the idle stroke function integrated into the lock unit S with the coupling spring F2, an idle path g consequently must be bridged by the unlocking lever 6 at least once in a permitted adjustment range against the pretensioning force applied by the coupling spring F2, in the present case at an end of the actuation necessary for unlocking.

Regardless of the design of the coupling mechanism K, a flexible utilization, for example, in combination with another lock unit, becomes possible via the proposed integration of an idle stroke function into a lock unit S, in this example premounted as a locking latch for a vehicle seat. As an example, in the case of a lock to be actuated manually, a change of an actuating movement of the unlocking lever 6 can be realized independently of an arresting pawl 3. Moreover, a variable gear ratio can be easily integrated in order to realize various actuating paths, actuating directions, movement sequences and movement force lines. Thus, with an unchanged design of a locking mechanism comprising the rotary latch 2 and the arresting pawl 3, different opening directions, different opening paths and different types of actuation or different force lines can be integrated into the lock unit S. Furthermore, for example in the case of two lock units which are mechanically coupled to each other and can be actuated by a common actuating element, a tolerance compensation and a temporally staggered actuation can easily be realized. For example, one lock unit S can still move in the idle stroke, while the other lock unit is still actuated.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 base plate (carrier)
10 locking receptacle
1A inside
1B outside
2 rotary latch (locking element)
20 rotary latch mouth
23 contact portion
3 arresting pawl (arresting element)
31 cutout (interface)
32 arresting portion
34 drive pin
4 additional arresting element
43 stop
5 microswitch (detection device)
6 unlocking lever (actuating element)
60 actuating area
62 plug-in sleeve (spring connecting portion)
68 slotted link portion
680 guide link
7 driver (driver element)
71 driver web (driver portion)
8 coupling rod (driver coupling member)
8.1 coupling lever (actuator coupling member)
8.2 coupling lever (driver coupling member)
81, 82 support portion
86 rod end
86a guide pin (guide element)
87 rod end
88 connecting joint
9 guide link
9A, 9B slotted link portion
B2, B3 threaded bolt (fastening element)
D2, D3 axis of rotation
F force
F1 return spring
F11 spring leg
F2 coupling spring
F21, F22 spring leg
g idle path/gap
K coupling mechanism
R6 actuating direction
R7 direction of rotation
S lock unit
α angle
φ actuating angle While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A lock unit for a vehicle, the lock unit comprising:
a carrier;
a locking element pivotally connected to the carrier and configured to pivot between a locking position and a release position;
an arresting element pivotally connected to the carrier and configured to pivot between an arresting position, in which the arresting element arrests the locking element to prevent the locking element from being adjusted from the locking position to the release position, and an unlocking position, in which the arresting element permits an adjustment of the locking element from the locking position to the release position;
an actuating element configured to be adjustable relative to the carrier within an adjustment range to pivot the arresting element from the arresting position in a direction towards the unlocking position; and
a coupling mechanism coupling the actuating element to the arresting element, the coupling mechanism configured to convert an adjusting movement of the actuating element to pivot the arresting element in the direction towards the unlocking position in a sub-section of the adjustment range of the actuating element
wherein the coupling mechanism includes at least one slotted link guide configured to convert the adjusting movement of the actuating element to pivot the arresting element, and
wherein the at least one slotted link guide includes a guiding slot, the guiding slot immovable with respect to the carrier, and the actuating element is configured to be adjusted relative to the guiding slot.

2. The lock unit of claim 1, wherein the coupling mechanism is configured to provide an idle stroke function integral to the lock unit, in which the actuating element is configured to be adjusted over at least an idle path of the adjustment range to release a locking provided via the lock unit, without causing a pivotal movement of the arresting element.

3. The lock unit of claim 2, wherein based on a starting position of the actuating element, from which the actuating element is adjustable to an end position within the adjustment range in order to adjust the arresting element from the arresting position in the direction of an unlocking position, wherein the idle path is formed
at a beginning of the adjustment range,
in a middle of the adjustment range,
at an end of the adjustment range, or
at the beginning of the adjustment range and at the end of the adjustment range.

4. The lock unit of claim 1, wherein the actuating element is pivotable relative to the carrier and/or mounted to the carrier.

5. The lock unit of claim 1, wherein the coupling mechanism includes a driver element rotatably mounted coaxially to an axis of rotation of the arresting element, and wherein the driver element is positively engaged with the arresting element.

6. The lock unit of claim 5, wherein the driver element includes a driver portion axially protruding with respect to the axis of rotation of the arresting element, the driver element is configured to positively engage the arresting element.

7. The lock unit of claim 5, wherein the coupling mechanism includes at least one driver coupling member configured to eccentrically articulate with respect to the axis of rotation of the arresting element.

8. The lock unit of claim 7, wherein the coupling mechanism includes at least one slotted link guide configured to convert an adjusting movement of the actuating element to a pivotal movement of the arresting element, and the at least one slotted link guide includes a guide element disposed on the driver coupling member and shiftably held on a guide link.

9. The lock unit of claim 8, wherein the guide element of the driver coupling member is shiftably held on an adjustable guide link and on the guide link, and the adjustable guide link and the guide link at least partially overlap one another.

10. The lock unit of claim 1, wherein the at least one slotted link guide includes a further guiding slot configured to be adjusted by the actuating element.

11. The lock unit of claim 1, wherein the guide link includes two slotted link portions which differ from each other to form different gear ratios between an adjusting movement of the actuating element and a resulting pivotal movement of the arresting element.

12. The lock unit of claim 11, wherein the two slotted link portions define two portions of a guideway, and the two portions of the guideway are configured to guide a guide element of the at least one slotted link guide along the guide link, the two portions of the guideway are oriented to each other at an angle ranging between 70° and 160°.

13. The lock unit of claim 1, wherein the coupling mechanism includes at least one spring element configured to apply a pretension force to the actuating element, wherein the actuating element works against whose pretension force as the actuating element is adjusted within the adjustment range for bridging an idle path.

14. The lock unit of claim 13, wherein the coupling mechanism includes an adjustable actuator coupling member, and the at least one spring is configured to pretension the actuating element with respect to the adjustable actuator coupling member of the coupling mechanism.

15. A lock unit for a vehicle, the lock unit comprising:
a carrier;
a locking element pivotally connected to the carrier and configured to pivot between a locking position and a release position;
an arresting element pivotally connected to the carrier and configured to pivot between an arresting position, in which the arresting element arrests the locking element to prevent the locking element from being adjusted from the locking position to the release position, and an unlocking position, in which the arresting element permits an adjustment of the locking element from the locking position to the release position;
an actuating element configured to be adjustable relative to the carrier within an adjustment range to pivot the arresting element from the arresting position in a direction towards the unlocking position; and
a coupling mechanism coupling the actuating element to the arresting element, the coupling mechanism configured to convert an adjusting movement of the actuating element to pivot the arresting element in the direction towards the unlocking position in a sub-section of the adjustment range of the actuating element,
wherein the coupling mechanism includes at least one spring element configured to apply a pretension force to the actuating element, wherein the actuating element works against whose pretension force as the actuating element is adjusted within the adjustment range for bridging an idle path, wherein the coupling mechanism includes an adjustable actuator coupling member, and the at least one spring is configured to pretension the actuating element with respect to the adjustable actuator coupling member of the coupling mechanism, and wherein as the actuating element is adjusted within a first sub-section of the adjustment range, in which the adjustment of the actuating element results in a pivotal movement of the arresting element, the actuator coupling member is configured to be adjusted together with the actuating element so that an adjusting force applied on the actuating element is transmitted to the actuator coupling member via the at least one spring element, and wherein as the actuating element is adjusted within a second sub-section, in which the idle path is to be bridged, the actuating element is configured to be adjusted relative to the actuator coupling member against the pretension force applied by the at least one spring element.

16. The lock unit of claim 15, wherein a beginning of the idle path, defined by the adjusting movement of the actuating element to pivot the arresting element to the unlocking position, is formed by a mechanical stop, wherein the actuator coupling member is configured to abut the mechanical stop at an end of the first sub-section.

17. The lock unit of claim 13, further comprising:
at least one return spring configured to provide an automatic reset of the actuating element.

18. A vehicle seat comprising the lock unit of claim 1.

19. A lock unit for a vehicle, the lock unit comprising:
a carrier;
a locking element pivotally connected to the carrier and configured to pivot between a locking position and a release position;
an arresting element pivotally connected to the carrier and configured to pivot between an arresting position, in which the arresting element arrests the locking element to prevent the locking element from being adjusted from the locking position to the release position, and an unlocking position, in which the arresting element permits an adjustment of the locking element from the locking position to the release position;
an actuating element configured to be adjustable relative to the carrier within an adjustment range to pivot the arresting element from the arresting position in a direction towards the unlocking position; and
a coupling mechanism coupling the actuating element to the arresting element, the coupling mechanism configured to convert an adjusting movement of the actuating element to pivot the arresting element in the direction towards the unlocking position in a sub-section of the adjustment range of the actuating element,
wherein the coupling mechanism includes a driver element rotatably mounted coaxially to an axis of rotation of the arresting element, and wherein the driver element is positively engaged with the arresting element, and
wherein the driver element includes a driver portion axially protruding with respect to the axis of rotation of the arresting element, the driver element is configured to positively engage the arresting element.

20. A lock unit for a vehicle, the lock unit comprising:
a carrier;
a locking element pivotally connected to the carrier and configured to pivot between a locking position and a release position;
an arresting element pivotally connected to the carrier and configured to pivot between an arresting position, in which the arresting element arrests the locking element to prevent the locking element from being adjusted from the locking position to the release position, and an unlocking position, in which the arresting element permits an adjustment of the locking element from the locking position to the release position;
an actuating element configured to be adjustable relative to the carrier within an adjustment range to pivot the arresting element from the arresting position in a direction towards the unlocking position; and
a coupling mechanism coupling the actuating element to the arresting element, the coupling mechanism configured to convert an adjusting movement of the actuating element to pivot the arresting element in the direction towards the unlocking position in a sub-section of the adjustment range of the actuating element,
wherein the coupling mechanism includes a driver element rotatably mounted coaxially to an axis of rotation of the arresting element, and wherein the driver element is positively engaged with the arresting element,
wherein the coupling mechanism includes at least one driver coupling member configured to eccentrically articulate with respect to the axis of rotation of the arresting element, and
wherein the coupling mechanism includes at least one slotted link guide configured to convert an adjusting movement of the actuating element to a pivotal movement of the arresting element, and the at least one slotted link guide includes a guide element disposed on the driver coupling member and shiftably held on a guide link.

21. A lock unit for a vehicle, the lock unit comprising:
a carrier;
a locking element pivotally connected to the carrier and configured to pivot between a locking position and a release position;
an arresting element pivotally connected to the carrier and configured to pivot between an arresting position, in which the arresting element arrests the locking element to prevent the locking element from being adjusted from the locking position to the release position, and an unlocking position, in which the arresting element permits an adjustment of the locking element from the locking position to the release position;
an actuating element configured to be adjustable relative to the carrier within an adjustment range to pivot the arresting element from the arresting position in a direction towards the unlocking position; and
a coupling mechanism coupling the actuating element to the arresting element, the coupling mechanism configured to convert an adjusting movement of the actuating element to pivot the arresting element in the direction towards the unlocking position in a sub-section of the adjustment range of the actuating element,
wherein the lock unit includes at least one return spring configured to provide an automatic reset of the actuating element and the coupling mechanism includes at least one spring element configured to apply a pretension force to the actuating element, wherein the actuating element works against whose pretension force as the actuating element is adjusted within the adjustment range for bridging an idle path.

\* \* \* \* \*